April 3, 1928.
A. MAYER
COOLING DEVICE
Filed Sept. 27, 1926
1,664,636
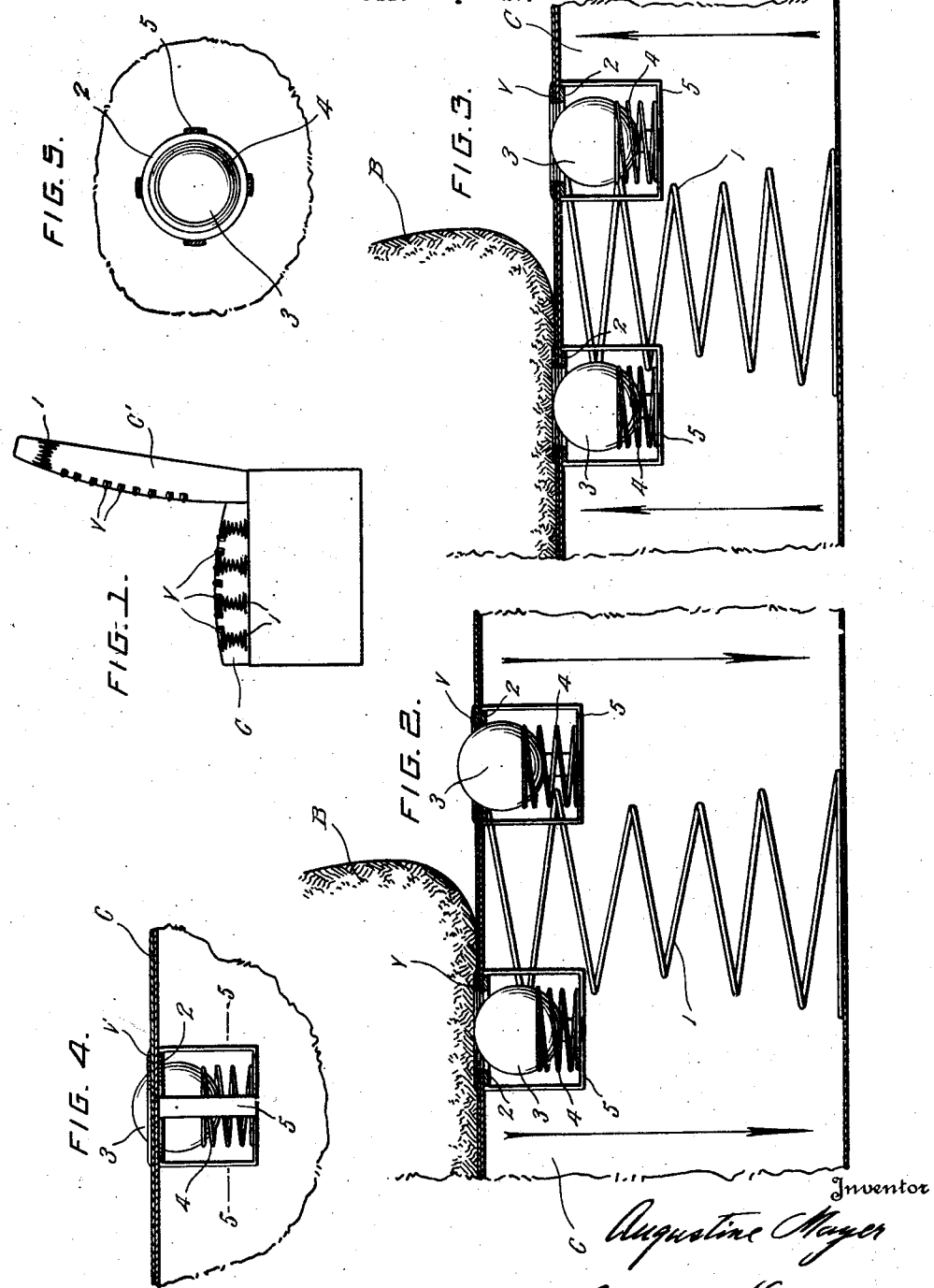
Inventor
Augustine Mayer
By Ogle R. Singleton
Attorney Patented Apr. 3, 1928.

1,664,636

UNITED STATES PATENT OFFICE.

AUGUSTINE MAYER, OF ST. AUGUSTINE, FLORIDA.

COOLING DEVICE.

Application filed September 27, 1926. Serial No. 138,005.

My invention consists in a new and useful improvement in cooling devices and is designed to provide the seat cushions of a vehicle with means whereby jets of cooling air from the cushions are forced against the body of the passenger by means of the oscillation of the vehicle when in motion. The particularly novel feature of my device is the arrangement of a plurality of valves in bellows-like compartments whereby air may be injected through a considerable number of openings when the cushions are distended, but ejected from an inconsiderable number of openings when the cushions are compressed, thus concentrating jets of air upon those portions of the body of the passenger resting upon the cushions.

In the drawings filed herewith, I have illustrated one specific embodiment of my invention, but it is to be understood that I do not consider my invention limited to said specific embodiment, but refer for its scope to the claims appended hereto.

In the drawings:

Fig. 1 is a diagrammatic view showing the arrangement of my device in a vehicle seat.

Fig. 2 is a vertical section of a portion of one of the cushions, the parts being shown in the positions they assume when the cushion is about to be compressed.

Fig. 3 is a view similar to Fig. 2, the parts being shown in the positions they assume when the cushion is about to expand.

Fig. 4 is a side elevation of one of the valves.

Fig. 5 is a section on the line 5—5 of Fig. 4.

As illustrated in the drawings, my device comprises two compartments C and C', adapted to serve as the seat and back cushions, respectively, of an automobile seat. These compartments C and C' are provided with suitable expansion springs 1 adapted to distend them. I provide a plurality of air valves V suitably disposed in the outer surfaces of the compartments C and C'. These valves V comprise valve seats 2 and ball valves 3 pressed by springs 4 held in cages 5 which are suitably attached to the walls of the compartments C and C'. B designates the body of a passenger seated upon the cushion formed by the compartment C.

From the foregoing description of the details of construction of my improved device, its use and operation will be obvious. When the weight of the body B of the passenger is removed from the cushion formed by the compartment C, by reason of the upward movement of the body B caused by the oscillation of the vehicle, the springs 1 cause the compartment C to be distended, tending to create a partial vacuum in the compartment C which causes air under atmospheric pressure to enter the compartment C through the valves V, by forcing open the ball valves 3 against the springs 4. Thus it will be seen that air is supplied through all of the valves V provided in the compartment C. When the weight of the body B is again imposed upon the cushion formed by the compartment C, the compartment C is compressed and the air therein is forced out through such of the valves V as are held open by reason of contact of the body B with the ball valves 3, the remaining ball valves 3 being held in closed position by the springs 4. Thus it will be seen that, while air is drawn into the compartment C through all of the valves V, it is forced out through only such of the valves V as are held open by contact of the body B, thus causing jets of air to be forced against the body B to cool the body B.

It is to be noted that it is within the scope of my invention to provide means, such as any suitable form of air pump, to create air pressure within the compartments C and C' to cause jets of air to be driven against the body B of the passenger, when the vehicle, being at a standstill, or for any other reason, is without oscillation.

Having described my invention, what I claim is:

1. A cooling device for a seat comprising an inflated cushion provided with a plurality of check valves consisting of spring pressed members disposed below the valve seats and having portions extending above the surface of the cushion, some of said valves being disposed within that area of the surface of the cushion with which the body of the user contacts, and others of said valves being disposed without that area of the surface.

2. In a cooling device for a seat, the combination of a cushion provided with an interior compartment; a plurality of valve seats in said cushion affording openings into said compartment; valve members having portions extending through the valve seats and above the surface of the cushion; means within said compartment adapted to support said members; and springs in said supporting means yieldingly holding said members against said valve seats.

In testimony whereof I affix my signature.

AUGUSTINE MAYER.